United States Patent
Blias (10) Patent No.: US 8,238,195 B2
(45) Date of Patent: Aug. 7, 2012

(54) METHOD FOR 3-C 3-D WAVEFIELD DECOMPOSITION

(75) Inventor: Emanouil Blias, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 690 days.

(21) Appl. No.: 12/352,967

(22) Filed: Jan. 13, 2009

(65) Prior Publication Data
US 2009/0185449 A1 Jul. 23, 2009

Related U.S. Application Data

(60) Provisional application No. 61/022,214, filed on Jan. 18, 2008.

(51) Int. Cl.
*G01V 1/40* (2006.01)
(52) U.S. Cl. .......................... 367/57; 367/38
(58) Field of Classification Search .............. 367/38, 367/57
See application file for complete search history.

(56) References Cited

U.S. PATENT DOCUMENTS

| 4,627,036 A | 12/1986 | Wyatt |
| 6,748,330 B2 | 6/2004 | Leaney |
| 6,834,235 B2 | 12/2004 | Muijs et al. |

FOREIGN PATENT DOCUMENTS
EP 1254383 B1 8/2005

OTHER PUBLICATIONS

Gulati et al.; "3C-3D VSP: the Blackfoot experiment," CREWES Research Report—vol. 10 (1998), pp. 9-1-9-27.*
E. Blias; "VSP Wavefield Separation. Wave-By-Wave Approach.," 75th Annual International Meeting, SEG/Houston 2005 Annual Meeting, pp. 2609-2612.
E Blias; "VSP wavefield separation: Wave-by-wave optimization approach," Geophysics, vol. 72, No. 4 (Jul.-Aug. 2007), pp. T-47-T-55.
E Blias; "Automatic high-density constrained velocity picking," CSEG Recorder, Jun. 2006, pp. 25-30.
C. Esmersoy; "Inversion of P and SV waves from multicomponent offset vertical seismic profiles," Geophysics, vol. 55, No. 1, (Jan. 1990), pp. 39-50.
B. Seeman et al.; "Vertical seismic profiling: Separation of upgoing and downgoing acoustic waves in a stratified medium," Geophysics, vol. 48, No. 5 (May 1983), pp. 555-568.
E. A. Blyas; "Optimization Solution of One-Dimensional Inverse Dynamic Problem," Russian Geology and Geophysics, vol. 38, No. 8, 1997, pp. 1434-1448.
R. R. Stewart; "Inversion of Vertically-Sampled Seismic Wave Fields," Vertical Seismic Profiling, eds., 1984, pp. 122-147.
W. S. P. Leany et al.; "Parametric Decomposition of Offset VSP Wave Fields," 59th Annual International Meeting, SEG, BG 1.8, 1989, pp. 26-29.

* cited by examiner

*Primary Examiner* — Ian Lobo
(74) *Attorney, Agent, or Firm* — Mossman Kumar & Tyler PC (57) ABSTRACT

An apparatus and a method for processing of three components, 3-Dimensions seismic (3-C, 3-D) data acquired by down-hole receivers and surface seismic sources. Automatic velocity analysis is used to identify the velocities of dominant events in a VSP panel. Different wave-types (downgoing P, downgoing PS, upcoming PS and upcoming PP) are identified and sequentially removed.

17 Claims, 9 Drawing Sheets

Depth
*FIG. 3A*

Depth
*FIG. 3B*

Depth
*FIG. 3C*

METHOD FOR 3-C 3-D WAVEFIELD DECOMPOSITION

CROSS-REFERENCES TO RELATED APPLICATIONS

This application claims priority from U.S. Provisional Patent Application Ser. No. 61/022,214 filed on Jan. 18, 2008.

BACKGROUND OF THE DISCLOSURE

1. Field of the Disclosure

This disclosure relates to a method of geophysical prospecting which improves the accuracy of seismic migration. Specifically, the disclosure uses well seismic measurements (Vertical Seismic Profiling: VSP) to accurately image reflectors present in the recorded data.

2. Description of the Related Art

In surface seismic exploration, energy imparted into the earth by a seismic source reflects from subsurface geophysical features and is recorded by a multiplicity of receivers. This process is repeated numerous times, using source and receiver configurations which may either form a line (2-D acquisition) or cover an area (3-D acquisition). The data which results are processed to produce an image of the reflector using a procedure known as migration.

Conventional reflection seismology utilizes surface sources and receivers to detect reflections from subsurface impedance contrasts. The obtained image often suffers in spatial accuracy, resolution and coherence due to the long and complicated travel paths between source, reflector, and receiver. In particular, due to the two-way passage of seismic signals through a highly absorptive near surface weathered layer with a low, laterally varying velocity, subsurface images may be of poor quality. To overcome this difficulty, a technique commonly known as Vertical Seismic Profiling (VSP) was developed to image the subsurface in the vicinity of a borehole. In a VSP, a surface seismic source is used and signals were received at a downhole receiver or an array of downhole receivers. This is repeated for different depths of the receiver (or receiver array). In offset VSP, a plurality of spaced apart sources are sequentially activated, or a single source may be activated at a plurality of spaced apart locations, enabling imaging of a larger range of distances than is possible with a single source.

The VSP data acquisition may be performed by conveying the receivers downhole on a wireline after drilling of the well has been partially or fully completed. An advantage of the VSP method is that the data quality can be much better than in surface data acquisition. The VSP acquisition may also be done by conveying the receiver array downhole as part of the bottomhole assembly (BHA). This is referred to as VSP while drilling.

Figure 1:
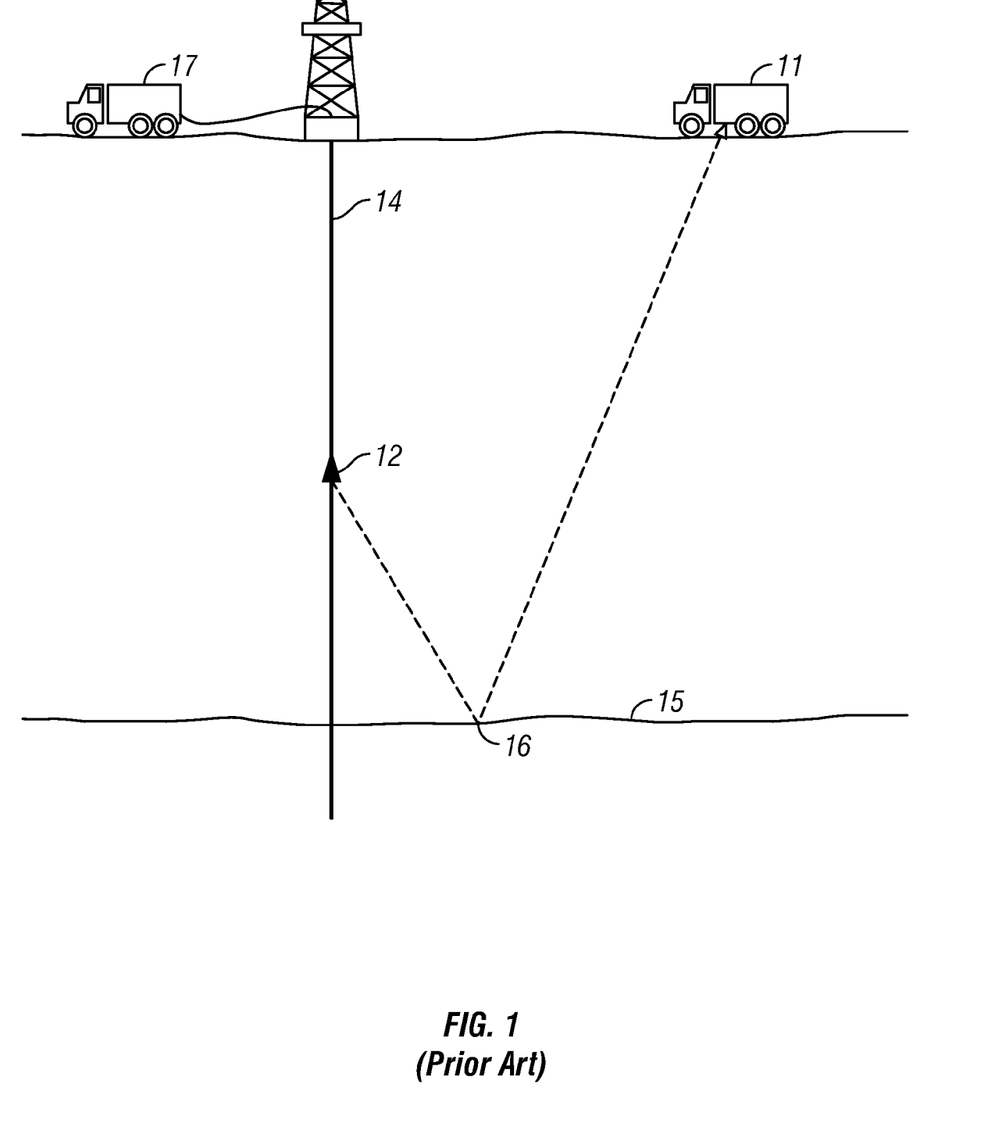
FIG. 1 (Prior Art) is a typical field geometry for the acquisition of VSP seismic data.

U.S. Pat. No. 4,627,036 to Wyatt et al., gives an early example of the VSP method. Referring now to FIG. 1, there is illustrated a typical VSP configuration for land seismic acquisition. In the exemplary figures, a Vibroseis® source 11 is illustrated as imparting energy into the earth. It is noted that any other suitable seismic source such as explosives could be utilized if desired. In a marine environment, the source could be an airgun or a marine vibrator.

A receiver 12 is shown located at a desired depth in the borehole 14. For the location of the receiver 12, energy would be reflected from the subsurface strata 15 at point 16. The output produced from receiver 12 is recorded by the recording truck 17. In VSP, the receiver 12 would typically be moved to a new location for each shot with the distance between geophone locations being some constant distance such as 50 feet. More commonly, an array of receivers spaced apart by some desired distance could be utilized and/or a plurality of sources spaced apart could be used. Usually, there is an array of receivers: use of a single receiver is rare.

Figure 2:
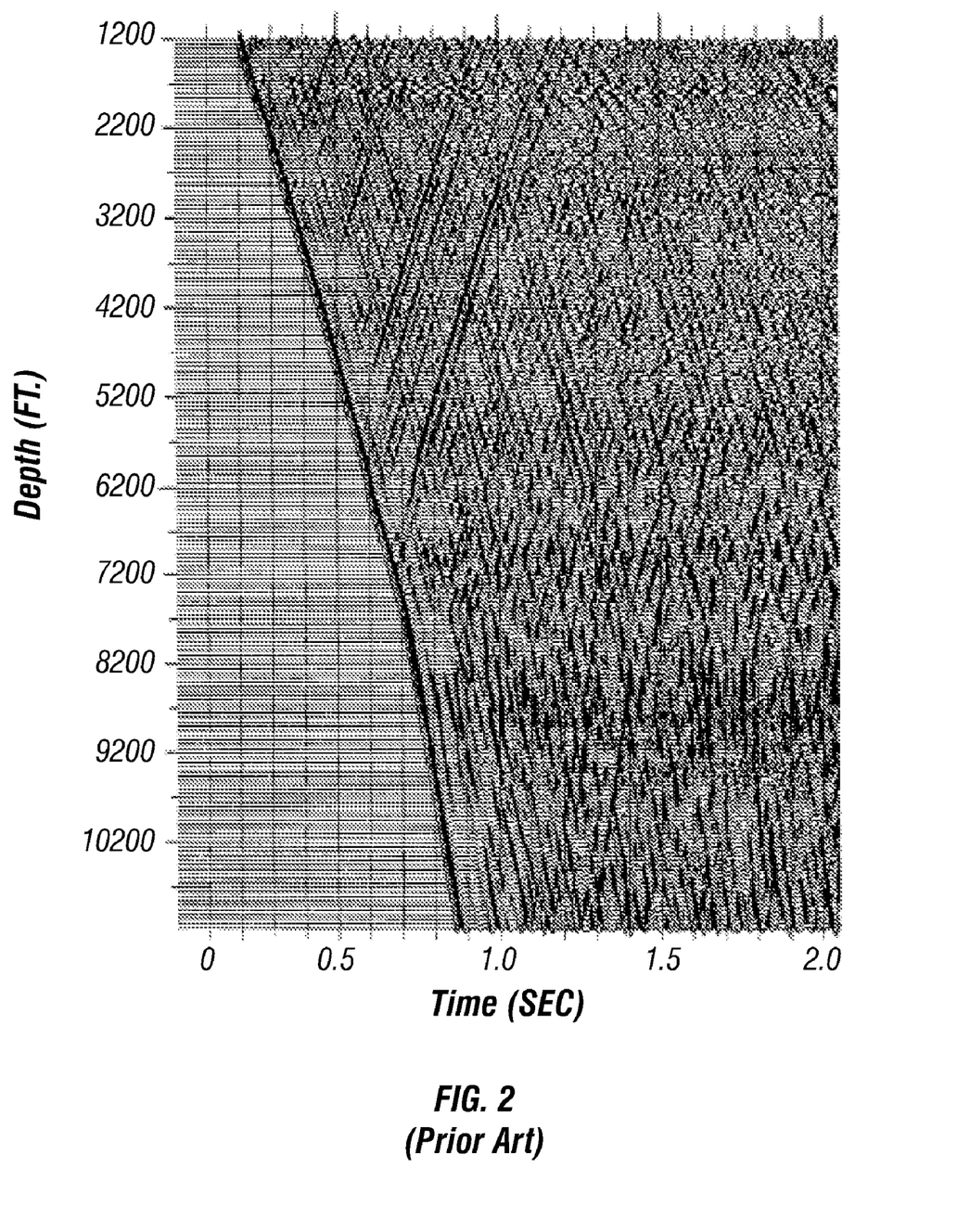
FIG. 2 (Prior Art) is an illustration of actual VSP seismic data.

Data obtained by VSP has the appearance of that illustrated in FIG. 2. Wyatt discusses the use of a processing technique called the VSP-CDP method by which VSP data such as those shown in FIG. 2 may be stacked to produce an image of the subsurface of the earth away from the well.

One of the problems with VSP data is the strong downgoing signals that mask the reflection signals that are indicative of the structure of the earth below the receiver array. Accordingly, a method called VSP wavefield separation is used in the processing of 3-D VSP data. The result is the individual extraction of the different kinds of regular waves present in the data: upgoing and downgoing P and S waves and tube waves.

A 3-C VSP wave-by wave separation approach was proposed by Blias (2005, 2007). This method models and subtracts each regular wave. After some modification, it also can be used to separate different waves (primaries and multiples) from surface seismic data. To use this approach, one needs to manually pick time events for each regular wave. For 1D and 2D VSP data, the amount of manual picking is relatively small. For 3-D VSP, the large number of shots dictates that the apparent velocity of each regular wave is dependent upon the source to receiver direction and the offset distance. Picking each wave is therefore a major time-consuming task. The present disclosure addresses the problem of automatic picking of VSP data. Automatic picking also leads to the strongest wave, which may have different type from one gather to another. Sometime, we cannot see all waves on the input VSP gather. This makes manual picking impossible for all waves, and requires additional manual picking after extraction strong events. However, after subtraction strong events, weak events could be recognized by automatic picking (3-C velocity analysis). This provides essential decreasing of manual work in 3-D VSP wavefield separation.

SUMMARY OF THE DISCLOSURE

One embodiment of the present disclosure is a method of imaging an earth formation. Three component, three dimensional VSP data are acquired. An automatic 3-C velocity analysis is carried out to determine the apparent velocity of the strongest event within a window. This strongest event is extracted and then subtracted from the windowed data and the process is repeated for additional waves up to a specified number. The upcoming PP waves may be used for imaging of the subsurface.

Another embodiment of the disclosure is an apparatus for imaging an earth formation. The apparatus includes a 3-C array deployed in a borehole and a source configured to be activated at a plurality of locations on the earth's surface. At least one processor is configured to sort the data recorded by the 3-C array and to carry out an automatic 3-C velocity analysis to determine the apparent velocity of the strongest event within a window. The at least one processor is further configured to extract and subtract this strongest event from the windowed data and repeat the process for additional waves up to a specified number. The processor may further be configured to process upcoming PP waves for imaging of the subsurface.

Another embodiment of the disclosure is a computer readable medium accessible to at least one processor. The computer-readable medium including instructions which enable the at least one processor to produce an image of an earth formation using a plurality of components of seismic data acquired at a plurality of vertically spaced apart locations in a borehole responsive to activation of a seismic source at at least one location on a surface of the earth by: representing the acquired seismic data by a plurality of wavefields; sequentially using a wavefield separation method to provide a filtered data set; and producing the image of the subsurface formation using the filtered data set.

BRIEF DESCRIPTION OF THE DRAWINGS

The present disclosure is best understood by reference to the attached figures in which like numerals refer to like elements, and in which.

DETAILED DESCRIPTION OF THE DISCLOSURE

For the present disclosure, a modified version of the prior art system shown in FIG. 1 is used. The receiver 12 comprises an array of spaced apart receivers. Typically, 5-80 receivers are used. Each receiver comprises a three-component (3-C) receiver. In one embodiment of the disclosure, the three components are labeled H1, H2 and Z components, the Z component being vertical, and the H1 and H2 axes are orthogonal to the Z axis and orthogonal each other. The receivers may be gimbal mounted. This facilitates use of the receivers in a deviated borehole. With such an arrangement, the mechanical construction of the horizontal component receivers is usually different from the mechanical construction of the Z component receiver due to the fact that the latter has gravity acting along the direction of motion of the receivers. Either geophones or accelerometers may be used. In an alternate embodiment of the disclosure, the three receivers are substantially identical in sensitivity and are oriented along the vertices of a tetrahedron. Orientation of the receivers is determined using any of the methods known in prior art. The seismic source may be an air gun (for marine acquisition) or a vibratory source (for land acquisition). The vibratory source would be on the surface of the earth while the airgun would be deployed in water. For the purposes of the present disclosure, deployment of the airgun in water is defined as a surface deployment.

Let us consider several neighboring geophones, located at different depths $d_1, d_2, \ldots, d_I$. Let $\vec{U}_i(t)$ be vector trace recorded at these geophones. The borehole observations are defined by the mathematical model in equation (1):

$$\vec{U}_i(t) = \sum_{k=1}^{K} \vec{a}_{i,k} f_k(t - \tau_{i,k}(t)) + \vec{\xi}_i(t), i = 1, 2, \ldots, I; \quad (1)$$

$t=t_{min}, t_{min}+\Delta t, t_{min}+2\Delta t, \ldots, t_{max}$. Here K is the number of regular waves (usually between 2 and 4); I is the number of receiver depth levels, t are time samples from $t_{min}$ to $t_{max}$ with the increment $\Delta t$; $\tau_{i,k}$ are time shifts of the waves, $a_{i,k}$ is an amplitude of the k-th wave at the i-th receiver; $f_k(t)$ are the wave functions (waveform for wave number k) and $\xi_i(t)$ stands for the random noise. In eqn. (1), it is assumed that time shifts depend on time t, that is $\tau=\tau(t)$. This allows us to consider waves with non-parallel event picks, implying different apparent velocities as commonly seen in offset VSP data. Amplitude dependence on the receiver depth takes into account AVO effects and makes eqn. (1) more accurate.

To determine the parameters of K waves, the present disclosures uses a least-squares method to minimize an objective function. Let "r" be the label for one of the wavefields that are to be extracted, i.e. r=1 for downgoing P wave, r=2 for upgoing P wave etc. Let $W_r(t)$ be the difference between the observed traces $U_i(t)$ and all waves with the exception of wave r. After flattening wave r (applying shifts $-\tau_{i,r}(t)$ to the traces in i-th receiver), the r-wave parameters are determined by minimizing the objective function (Blias, 2007):

$$\Psi_r = \sum_{i=1}^{I} \sum_{t=t_{min}}^{t_{max}} \left\| \vec{W}_{r,i}(t + \tau_{i,r}(t)) - \vec{a}_{i,r} f_r(t) \right\|^2. \quad (2)$$

Knowing time shift functions $\tau_{i,k}(t)$, we can determine amplitudes $a_{i,k}$ and wave functions $f_k(t)$ through an eigenvector solution of a matrix (Blias, 2007). The matrix can be calculated using VSP traces $U_i(t)$. To calculate time shifts $\tau_{i,k}(t)$, initial approximations for these are needed.

To minimize function $\Psi_r$, we need initial values for the time shift functions $\tau_{i,k}(t)$. For this, we use automatic 3-C velocity analysis for each 3-D VSP gather. Let's consider VSP gather in the moving time window $[t_{beg}, t_{end}]$. We assume that in this time window, time shift function can be considered constant; amplitudes may vary across the analysis window.

As the amplitude of the wave should not change rapidly from one depth to another, the amplitudes (for each wave k in equation (1)) are represented as a linear combination of smooth basis functions. For brevity, let's describe amplitude vs. offset (AVO) effect with linear changes of amplitudes along the receiver depth, depending on two coefficients a(t) and b(t). We use a 3-C generalization of the semblance coherence measure E(v) that takes into account linear amplitude changes (Blias, 2006):

$$E(v) = 1 - \frac{D_x(v) + D_y(v) + D_z(v)}{\sum_t \sum_i [U_{xi}^2(t - \tau(v)) + U_{yi}^2(t - \tau(v)) + U_{zi}^2(t - \tau(v))]} \quad (3)$$

where

-continued $$D_x = \sum_t \sum_{i=1}^{N} [a_x(t) + b_x(t)d_i - U_{xi}(t - \tau(v))]^2, \quad (4)$$

$$D_x = \sum_t \sum_{i=1}^{N} [a_x(t) + b_x(t)d_i - U_{xi}(t - \tau(v))]^2,$$

$$D_x = \sum_t \sum_{i=1}^{N} [a_x(t) + b_x(t)d_i - U_{xi}(t - \tau(v))]^2.$$

Time shifts $\tau_i(v)$ depend upon a scanning apparent velocity v: $\tau_i(v)=(i-1)\Delta d/v$ where $\Delta d$ is the receiver depth interval; $U_x$, $U_y$ and $U_z$ are coordinates of vector U, and $d_i$ is the depth of i-th receiver. We are looking for a minimum value of E(v) by calculating amplitude coefficients $a_x(t)$ and $b_x(t)$ from a linear system for each time t:

$$\partial E/\partial a_x(t) = \partial E/\partial a_y(t) = 0 \quad (5)$$

These equations can be written as:

$$a_x(t)\sum_{i=1}^{N} 1 + b_x(t)\sum_{i=1}^{N} h_i = \sum_{i=1}^{N} U_{xi}(t-\tau),$$

$$a_x(t)\sum_{i=1}^{N} h_i + b_x(t)\sum_{i=1}^{N} h_i^2 = \sum_{i=1}^{N} U_{xi}(t-\tau)h_i.$$

Similarly, we solve similar linear systems for coordinates y and z to find coefficients $a_y(t)$, $b_y(t)$ and $a_z(t)$, $b_z(t)$ for each time t. We then substitute these values into formula (1) and calculate the coherence measure for the current velocity v. Scanning velocity v, we choose the maximum E with the corresponding velocity. This approach can be easily generalized for a more complicated amplitude dependence with depth $h_i$. We consider eqn. (4) as a generalization of the 3-C velocity analysis for AVO effects.

Figure 3A:
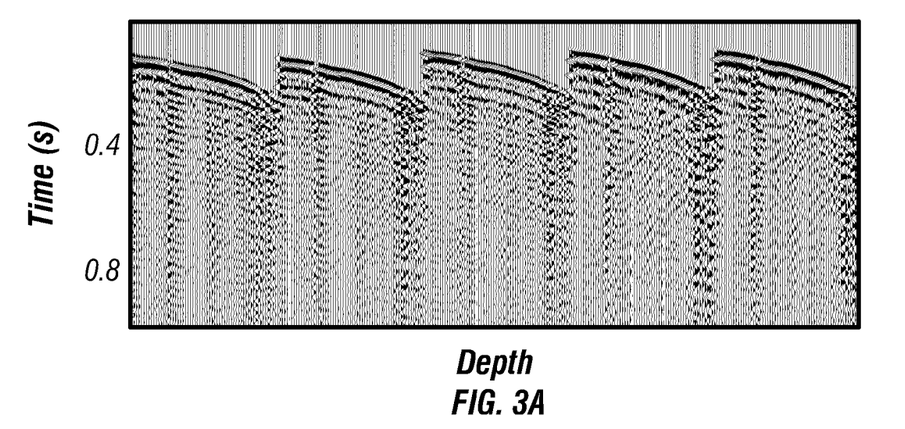
FIGS. 3A-3C show five exemplary panels of x-, y- and z-component VSP data.
Figure 3B:
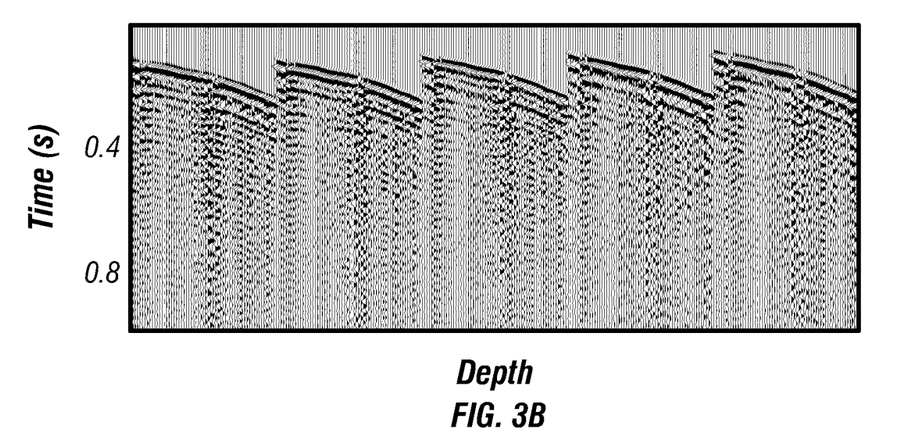
Figure 3C:
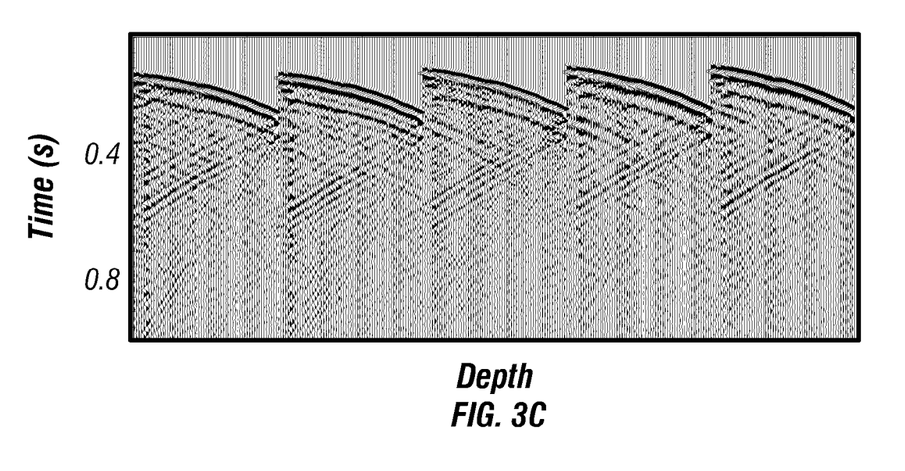
Figure 4A:
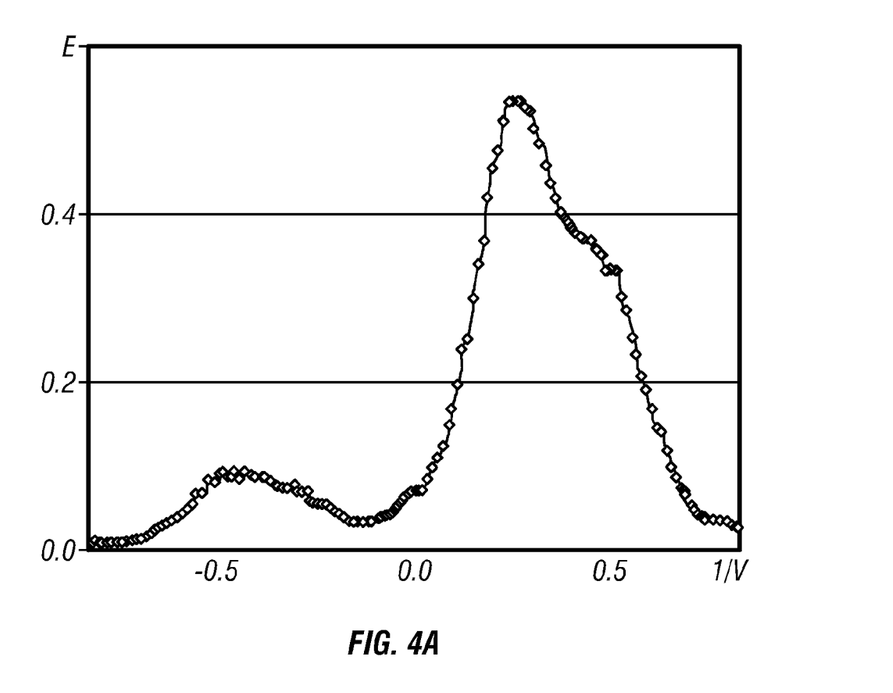
FIGS. 4A-4D show the coherence function at different steps of wave-removal.
Figure 4B:
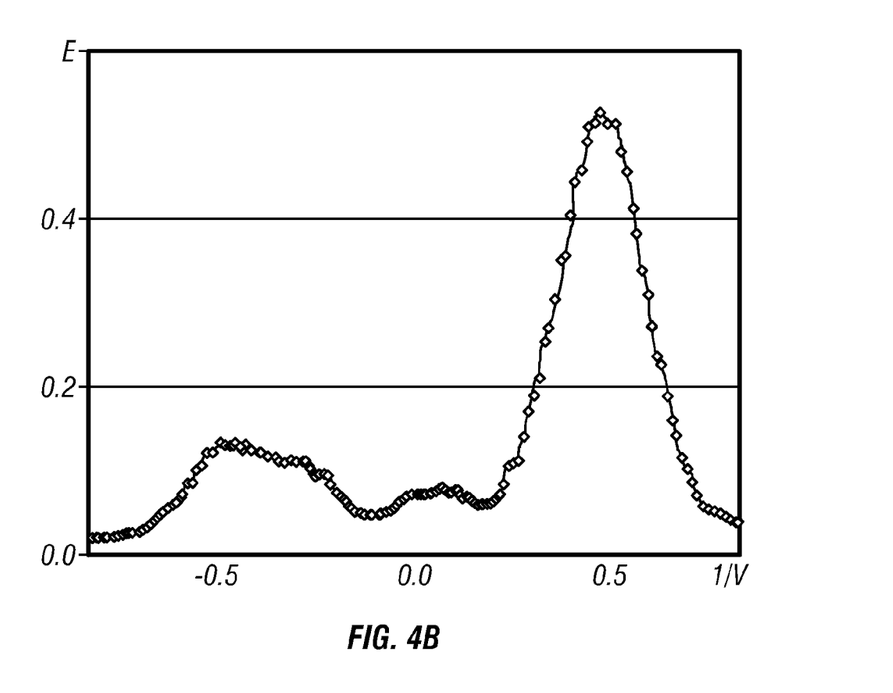
Figure 4C:
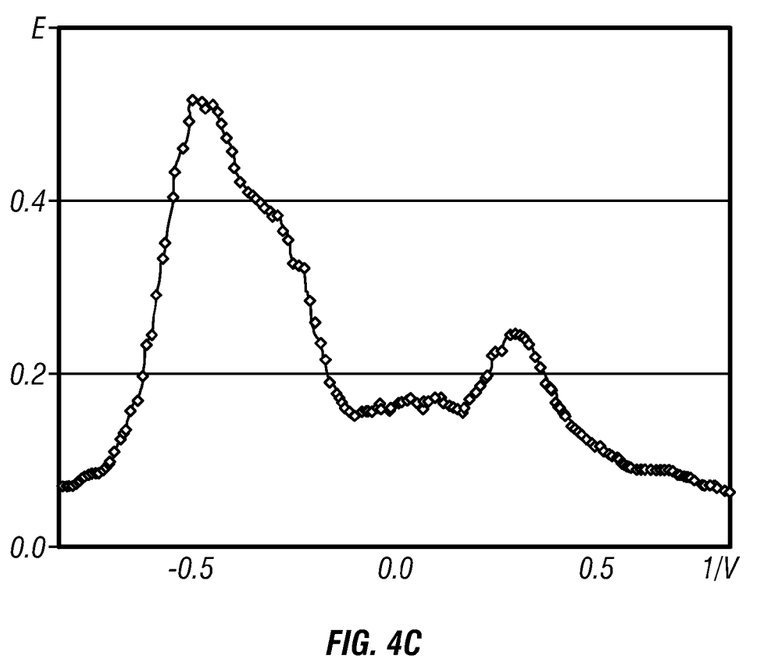
Figure 4D:
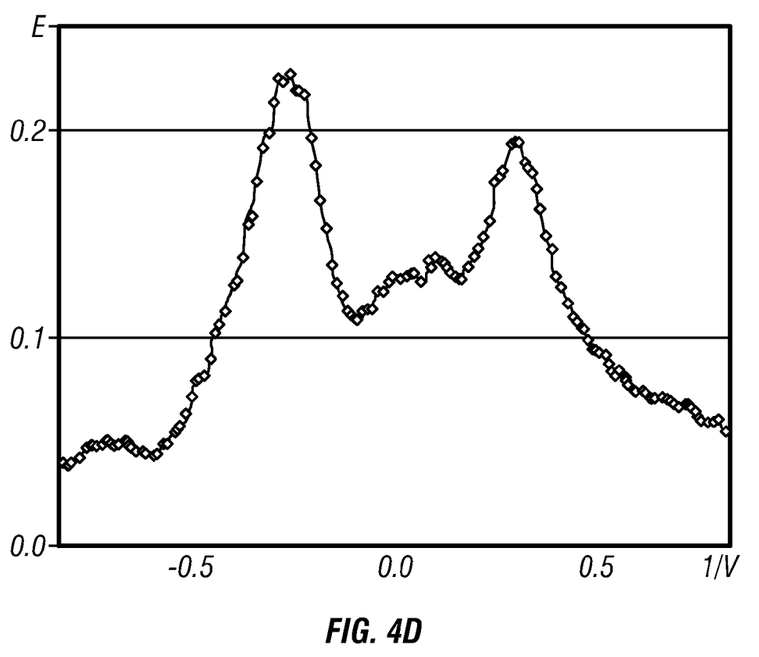

FIGS. 3A-3C shows examples of x-, y- and z-component VSP data respectively. Five panels are shown corresponding to five different positions of the source relative to the borehole. FIG. 4A shows a coherence function E(v) for the initial wavefield. FIG. 4B shows the coherence function for the wavefield after the downgoing P-wave has been removed. FIG. 4C shows the coherence function E(v) after removing the downgoing P and P-S waves. The latter result from mode conversion of downgoing P waves at an intermediate interface to a downgoing shear wave. FIG. 4D shows the coherence function E(v) after removing all waves except the upcoming P waves.

Figure 5A:
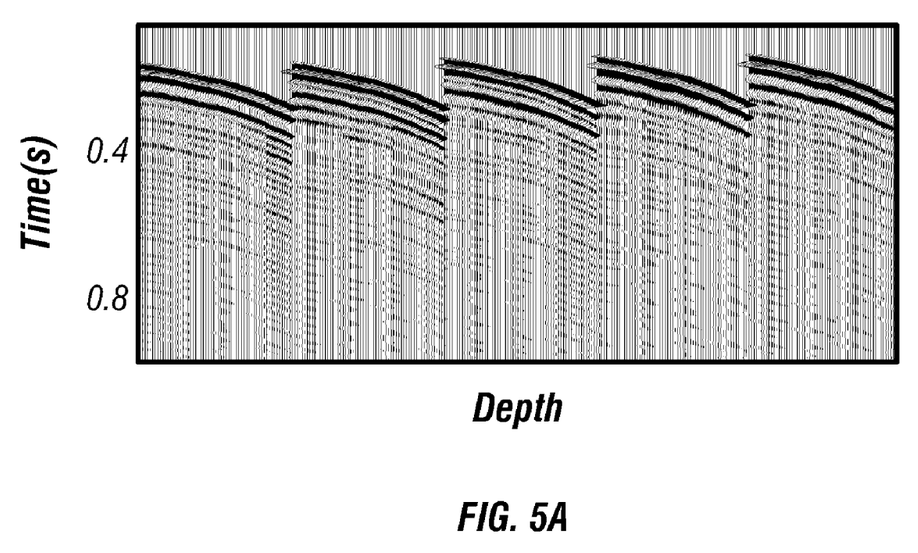
FIGS. 5A-5D shows the results of extracting: (a) the downgoing PP waves, (b) the downgoing PS waves, (c) the upcoming PS waves, and (d) the upcoming PP waves.
Figure 5B:
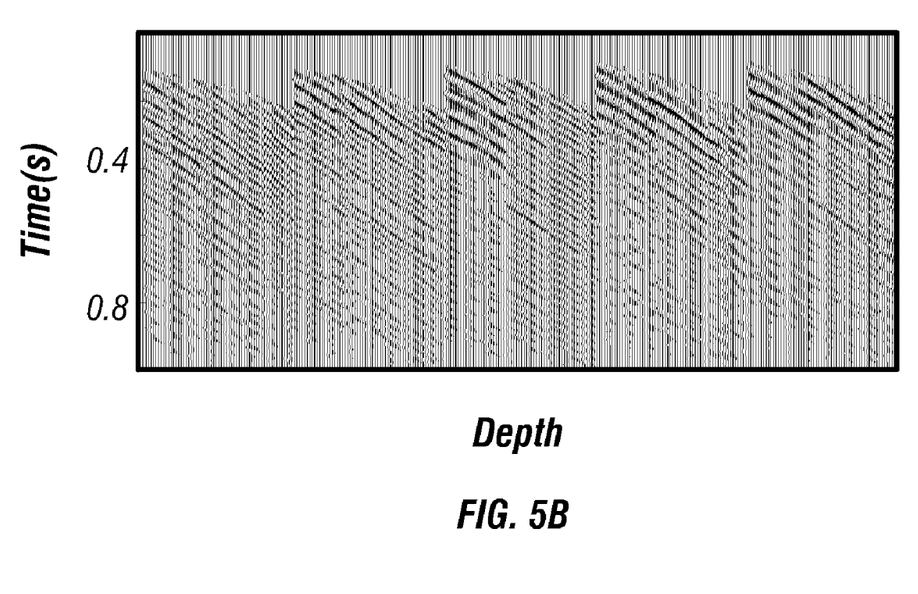
Figure 5C:
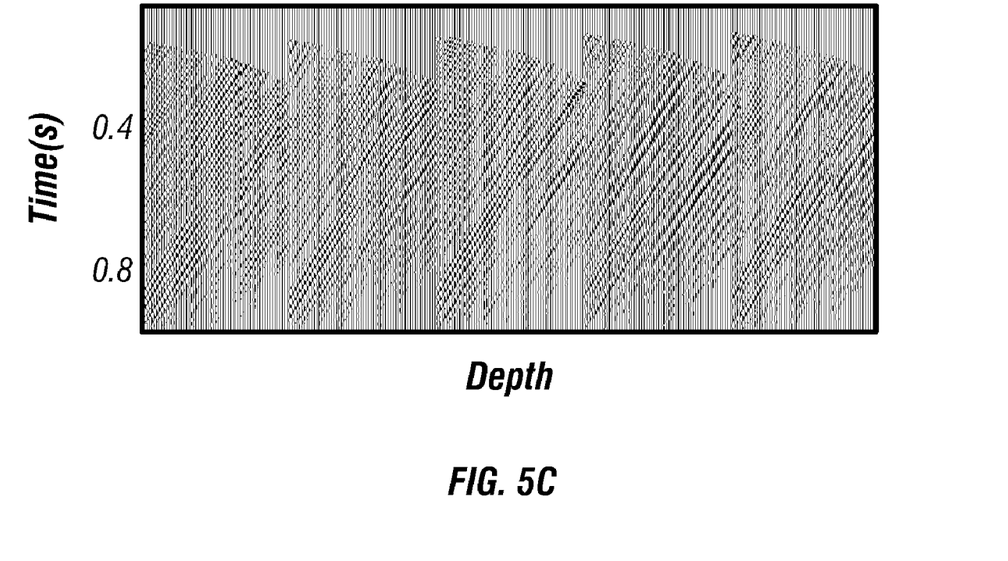
Figure 5D:
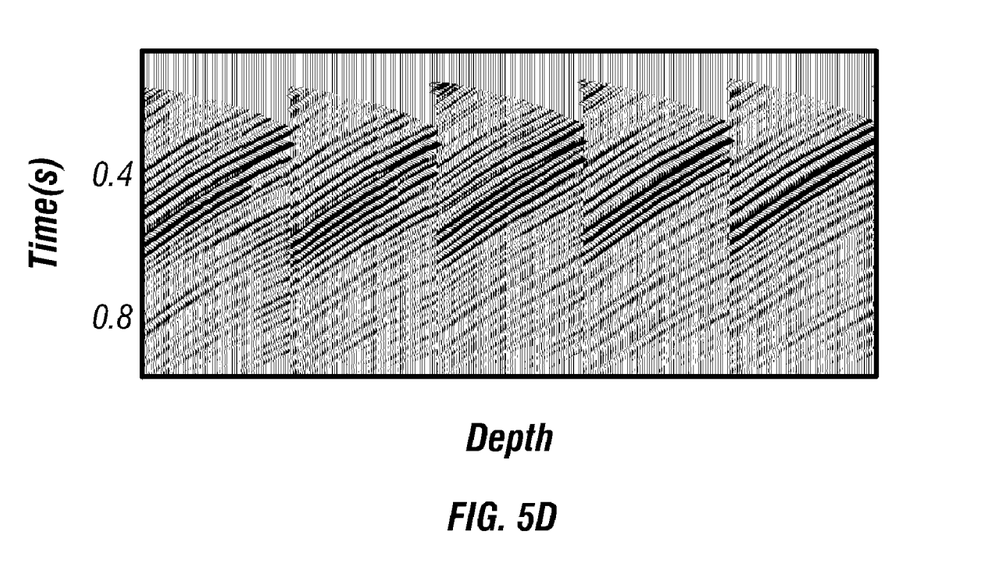

FIG. 5A shows the extracted downgoing P waves, the removal of which gave the coherence function of FIG. 4A. FIG. 5B shows the extracted downgoing PS waves, FIG. 5C shows the upcoming PS waves, and FIG. 5D shows the upcoming PP waves. It is the last that is particularly useful in imaging of the subsurface using known migration techniques. Wave extraction is performed using an 8 trace sliding depth separation window. Initial apparent velocities were obtained after automatic 3-C velocity analysis in a 16 trace spatial window. For each depth within the eight-trace separation window, all waves were extracted. Because the window slides down trace by trace, for each depth there are several traces for each extracted wave. To calculate the final trace for each depth we stack all traces.

Figure 6A:
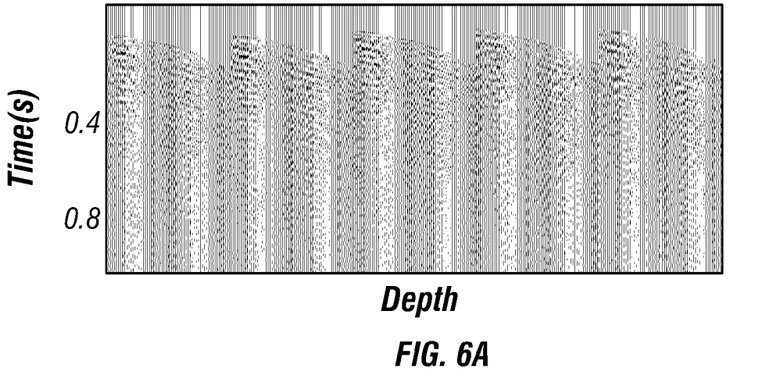
FIGS. 6A-6C show the stacked x-, y- and z-component residual signals.
Figure 6B:
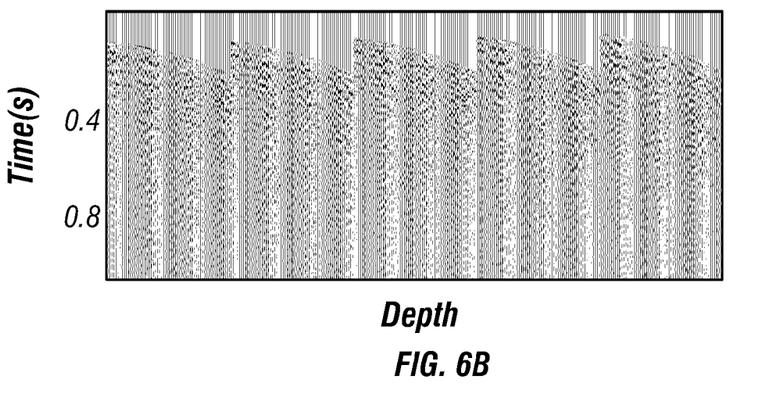
Figure 6C:
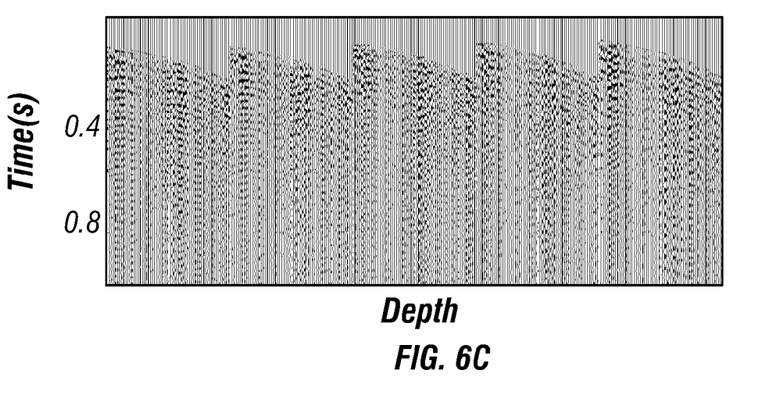

FIGS. 6A-6C show the residual x-, y- and z-components after removal of the wave types identified in FIGS. 5A-5D. This shows that most of the signals recorded in a VSP survey are of the wave types identified in FIGS. 5A-5D.

Figure 7:
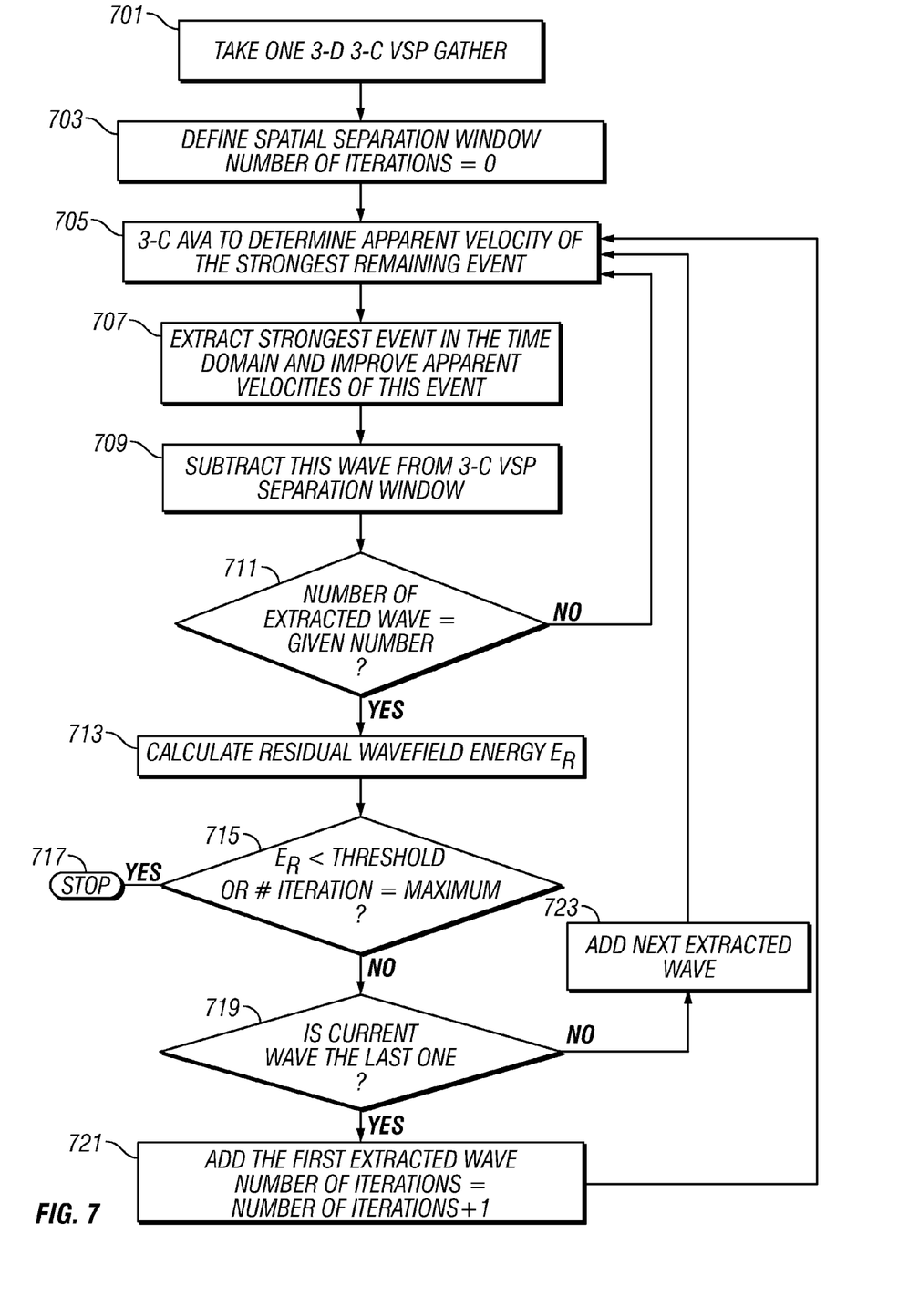
FIG. 7 is a flow chart illustrating some of the steps of implementation of the present disclosure.

Turning now to FIG. 7, a flow chart of some of the steps of the present disclosure. At 701, a set of 3-D VSP data is gathered. A spatial separation window of typically between 15 to 30 traces is defined, and the iteration count is set to 0 703. Automatic velocity analysis is carried out to pick the strongest event in this window 705. The strongest event in the time domain is then extracted in the time domain, using one-wave model with unknown amplitudes and waveform 707. This strongest event is then subtracted from the window 709. A check is made to see if the number of extracted events equals a predefined number of events to subtract 711. If not, processing returns to 705. If so, processing proceeds to 713 where the residual wavefield energy ER is calculated. A check is made to see if the residual energy is less than a predetermined threshold or a specified maximum number of iterations has been reached 715. If so, processing stops 717. If not, the check is made to see if the current wave is the last one 719. If not, processing returns to 705 after adding the extracted wave 723. If so, processing goes to 721 wherein the first extracted wave is added and the number of iterations is incremented by 1 and processing returns to 705. As can be seen, this includes a sequential wavefield separation in which one wavefield type is extracted at a time.

Baker Hughes Incorporated has a multi-level receiver (MLR) that can be configured from 1 to 13 levels. This greatly speeds up the data acquisition. The downhole receivers can be run in combination with other logging services, either wireline or pipe-conveyed, reducing the number of trips into the well and saving rig time. In high-angle wells, the downhole receiver can be conveyed on drill pipe or coiled tubing and also run in combination with a variety of openhole logging services greatly reducing rig time.

The wavefield separation methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, multicomponent seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multicomponent data and process the data according to the method described above.

While the foregoing disclosure is directed to the preferred embodiments of the disclosure, various modifications will be apparent to those skilled in the art. It is intended that all such variations within the scope and spirit of the appended claims be embraced by the foregoing disclosure.

What is claimed is:

1. A method of imaging an earth formation comprising:
   acquiring a plurality of components of seismic data at a plurality of vertically spaced apart locations in a borehole responsive to activation of a seismic source at least one location on a surface of the earth;
   generating a plurality of wavefields using the acquired seismic data;
   using a wavefield separation method iteratively to provide a filtered data set, the wavefield separation method comprising:

extracting a strongest event, and
subtracting the strongest event from the plurality of wavefields; and
producing an image of the subsurface formation using the filtered data set.

2. The method of claim 1 wherein performing the wavefield separation further comprises:
defining a window in time and space of seismic data;
estimating a coherence of the plurality of components of the seismic data in the window for a plurality of velocities corresponding to a selected wave type; and
subtracting a signal corresponding to a peak value of the estimated coherence from the seismic data.

3. The method of claim 1 wherein the acquired seismic data is dominated by a downgoing P-wave.

4. The method of claim 2 wherein estimating the coherence further comprises representing each of a plurality of components of seismic data as a linear function of a depth of the locations and a scanning velocity.

5. The method of claim 2 wherein the selected wave type is selected from the group consisting of: (i) as downgoing P-wave, (ii) a downgoing P-S-wave, and (iii) a downgoing S wave.

6. The method of claim 1 wherein acquiring the plurality of components of seismic data further comprises using a sensor selected from: (i) a geophone, and (ii) an accelerometer.

7. The method of claim 1 further comprising using a source selected from: (i) an airgun, and (ii) a vibratory source.

8. The method of claim 1 wherein the filtered data set further comprises an upcoming PP reflection.

9. A system configured to image an earth formation comprising:
a plurality of vertically spaced apart sensors deployed in a borehole configured to acquire a plurality of components of seismic data and responsive to activation of a seismic source at least one location on a surface of the earth; and
at least one processor configured to:
generate a plurality of wavefields using the acquired seismic data;
use a wavefield separation method iteratively to provide a filtered data set, wherein, to perform the wavefield separation method the at least one processor is further configured to:
extract a strongest event, and
subtract the strongest event from the plurality of wavefields; and
produce an image of the subsurface formation using the filtered data set.

10. The system of claim 9 wherein the at least one processor is further configured to perform the wavefield separation method by further:
defining a window in time and space of seismic data;
estimating a coherence of the plurality of components of the seismic data in the window for a plurality of velocities corresponding to a selected wave type; and
subtracting a signal corresponding to a peak value of the estimated coherence from the seismic data.

11. The system of claim 9 wherein the acquired seismic data is dominated by a downgoing P-wave.

12. The system of claim 10 wherein the at least one processor is further configured to estimate the coherence by further representing each of a plurality of components of seismic data as a linear function of a depth of the locations and a scanning velocity.

13. The system of claim 10 wherein the selected wave type is selected from the group consisting of: (i) a downgoing P-wave, (ii) a downgoing P-S-wave, and (iii) a downgoing S wave.

14. The system of claim 9 wherein the plurality of vertically spaced apart sensors are selected from: (i) a geophone, and (ii) an accelerometer.

15. The system of claim 9 further wherein the source selected from: (i) an airgun, and (ii) a vibratory source.

16. A non-transitory computer-readable medium product accessible to at least one processor, the computer-readable medium including instructions which enable the at least one processor to:
produce an image of an earth formation using a plurality of components of seismic data acquired at a plurality of vertically spaced apart locations in a borehole responsive to activation of a seismic source at least one location on a surface of the earth by:
generating a plurality of wavefields using the acquired seismic data;
using a wavefield separation method iteratively to provide a filtered data set, the wavefield separation method comprising:
extracting a strongest event, and
subtracting the strongest event from the plurality of wavefields; and
producing the image of the subsurface formation using the filtered data set.

17. The non-transitory computer-readable medium product of claim 16 further comprising at least one of: (i) a ROM, (ii) an EPROM, (iii) an EAROM, (iv) a flash memory, and (v) an optical disk.

* * * * *